United States Patent [19]

Neubert et al.

[11] Patent Number: 5,596,810
[45] Date of Patent: Jan. 28, 1997

[54] MACHINE TOOL

[75] Inventors: Werner Neubert; Joachim Schadow; Joachim Mueller, all of Stuttgart; Manfred-Otto Staebler, Waldenbuch; Manfred Dohr, Esslingen; Heinz Warkentin, Allmersbach im Tal, all of Germany

[73] Assignee: Robert Bosch GmbH, Stuttgart, Germany

[21] Appl. No.: 207,824

[22] Filed: Mar. 7, 1994

[30] Foreign Application Priority Data

Mar. 5, 1993 [DE] Germany .......................... 43 06 975.4

[51] Int. Cl.[6] .......................... B23D 49/10; B27B 19/09
[52] U.S. Cl. .............................................. 30/369; 30/392
[58] Field of Search .............................. 30/369, 392, 393, 30/394, 355, 123.3, 123.4; 173/DIG. 1, DIG. 2, DIG. 3

[56] References Cited

U.S. PATENT DOCUMENTS 4,798,001   1/1989   Grossmann et al. ................. 30/369 X

FOREIGN PATENT DOCUMENTS 0267312   5/1988   European Pat. Off. .

*Primary Examiner*—Eugenia Jones
*Attorney, Agent, or Firm*—Michael J. Striker

[57] ABSTRACT

A hand machine tool operated with two hands has a machine housing composed of insulating synthetic plastic shells, a fixed, web-shaped main handle formed as a part of the machine housing, an auxiliary handle, a drive including a motor and a transmission, at least one inner housing accommodating the motor and the transmission and surrounded by the synthetic plastic shells, and a tool driven by the drive. The handles, the machine housing, the inner housing and the tool are arranged so that forces applied to at least one of the handles are withdrawn from the machine housing by transferring the forces by the main handle directly to the inner housing without deforming the machine housing and then transferring the forces from the inner housing to the tool.

11 Claims, 4 Drawing Sheets

MACHINE TOOL

BACKGROUND OF THE INVENTION

The present invention relates generally to hand machine tools.

More particularly, it relates to a hand machine tool, in particular an electric hand machine tool such as a sword saw, a chain saw, a hedge clipper or the like to be operated by both hands, which has a machine housing with a fixed handle and preferably with an additional handle, wherein a motor and a transmission are arranged in an inner housing surrounded by synthetic shell of the machine housing.

Hand machine tools of the above mentioned general type are known in the art. The European document EP 267 312 discloses a hand machine tool and in particular a sword saw, in which the housing is composed of two synthetic plastic shells surrounding two inner housings coupled with one another. One of the inner housings surrounds the motor and forms a bearing tip for a commutator-side bearing and a lower bearing, while the other inner housing surrounds the transmission with toothed gears and lubricant filling. The known sword saw has relatively compact dimensions and is light, so that a synthetic plastic mounting of the housing is not subjected to substantial deformations either by its own mass or by high clamping moments at the handle during operation with the sword saw. Moreover, the outer forces deforming the synthetic plastic housing are retained remote from the both inner housings of the motor bearings.

The sword saw has no saw blades with plunging-in teeth. It cannot perform plunging-in operation with the sword tip. The operating forces or moments acting on the synthetic plastic housing or the handle are relatively small. The manufacture and mounting of the hand machine tool is however very expensive due to the three housings which must be connected with one another. For a hand machine tool of the next higher weight and power class this construction leads to excessively high mass and inconvenience to handle and therefore is suitable only for hand machine tools with low power, particularly without a plunging-in operation.

SUMMARY OF THE INVENTION

Accordingly, it is an object of the present invention to provide a hand machine tool, which avoids the disadvantages of the prior art.

In keeping with these objects and with others which will become apparent hereinafter, one feature of the present invention resides, briefly stated, in a hand machine tool of the above mentioned type in which forces applied through the handle or the auxiliary handle, in particular operating forces, are withdrawn from the machine housing, in that they are transmitted from the handle, preferably without deforming the machine housing directly to the inner housing and from there to the tool, in particular through the sword.

When the hand machine tool is designed in accordance with the present invention, it has the advantage that it is more powerful and at the same time is only insignificantly heavier than the known machine tools, and at least has the same stability and reliability against deformation of the housing, in particular during plunging-in with the saw blade tip, or in other words in condition of unusually high bending moment on the handle. The force transmission from the sword saw to the workpiece is very direct and hard. Thereby the control of the cutting guidance during sawing is improved. Moreover, the number of the individual parts is reduced, one inner housing is dispensed with, and thereby the manufacturing, mounting and storage costs are reduced.

In accordance with a further advantageous feature of the present invention, the closure of the inner housing is performed by a cover-shaped part which is simple to produce, is mountable from both sides, and non-releasably connected with sealing means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
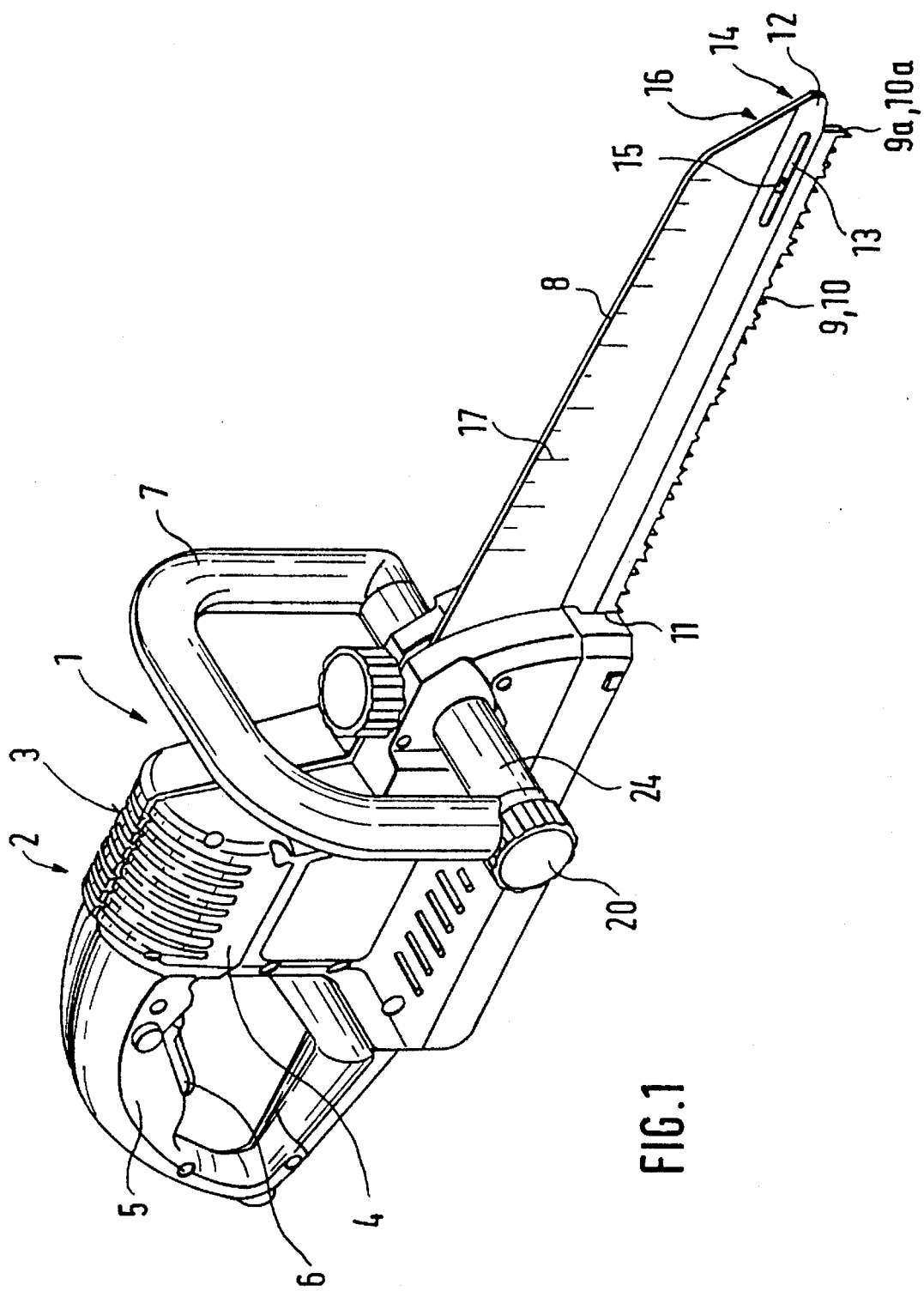
FIG. 1 is a perspective view of a sword saw in accordance with the present invention.

A hand machine tool in accordance with the present invention formed as a sword saw is identified in FIG. 1 with reference numeral 1. It has a machine housing 2 composed of left and right synthetic plastic shells 3 and 4 of insulating material. The machine housing 2 is shaped to form a fixed operating handle 5 with an on-off switch 6 and carries an adjustable, bucket-shaped auxiliary handle 7. A sword 8 is connected with the machine housing 2 and guides a pair of reciprocating saw blades 9 and 10 which extend through a throughgoing opening 11 in the machine housing 2.

Longitudinal slots 13 and 14 are provided on a sword tip 12 at both sides of the sword 8 near the saw blades 9 and 10. The saw blades 9 and 10 are provided with sliding block-like projections 15 and 16 which correspond to the longitudinal slots 13 and 14 are non-releasably guided in the latter. The sword 8 is provided with marking lines 17 at its rear 18. The ends of the saw blades 9 and 10 are formed as plunging-in teeth 9a and 10a. The auxiliary handle 7 is mounted on the machine housing 2 by a mounting axle 19 shown in FIG. 2, and nut 20 and a spacer pipe 24.

Figure 2:
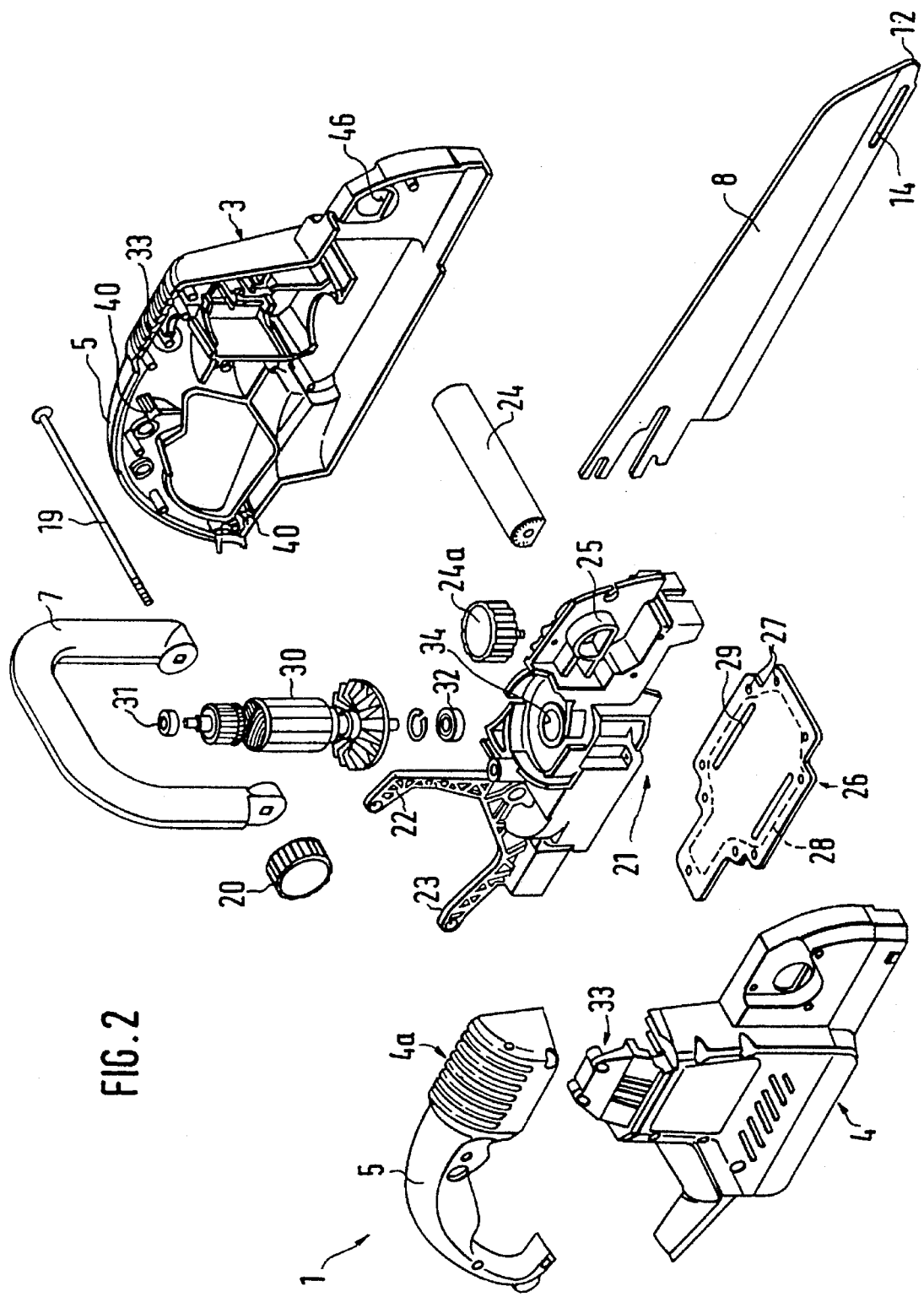
FIG. 2 is an exploded view of important parts of the inventive sword saw of FIG. 1.

The exploded of FIG. 2 shows the sword saw 1 with the left and right synthetic plastic shells 3, 4, the right upper synthetic plastic shell 4a, the regions of the synthetic plastic shells 3, 4, 4a which are formed as the handle 5, the auxiliary handle 7 which is mounted by the mounting axle 19 and the nut 20 on the machine housing 2, an inner housing 21 with an upper and lower arm 22 and 23 for force conversion of the operating forces acting on the handle 5 away from the housing shells 3, 4, 4a, the spacer pipe 24 which extends through the synthetic plastic shells 3, 4, 4a and the inner housing 21 and is transversely displaceable in its guiding cylinder 25 and fixed by a screw wheel 24a. It also shows a lower sealing cover 26 of the inner housing 21 with openings 27 for passage of not shown mounting screw, with a circular sealing strip 28 with which it is injection molded at both sides, and with stabilizing serrations 29. This Figure also shows the sword 8 with the sword tip 12 which is releasably supported by the inner housing 21.

The machine tool further has a rotor motor including 30 with a commutator and a blower wheel, as well as with upper and lower bearings 31 and 32 arranged in an upper bearing seat 33 in the synthetic plastic shells 3, 4a and a lower bearing seat 34 in the inner housing 21, as can be seen in this drawing. Also, this drawing shows cylindrical hollow projections passage of screws a recess 46 also shown in FIGS. 5 and 7 for passage of the spacer pipe 24.

Figure 3:
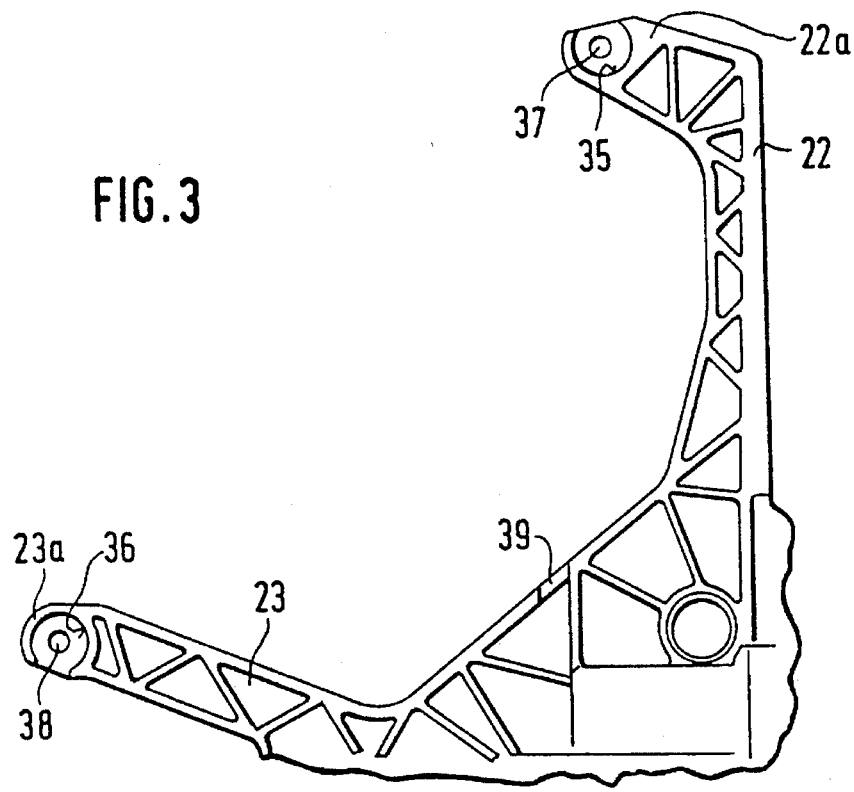
FIG. 3 is abide view of an arm of the inner housing of the inventive sword saw.

The construction of the upper and lower arms 22 and 23 of the inner housing 21 shown in FIG. 3 has the skeleton-like structure which is reinforced by ribs and has ears 35, 36 arranged at the free ends 22a and 23a for centering the synthetic plastic shells 3, 4, 4a. It also has openings 37, 38 for passage of the screws for connecting the synthetic plastic shells 3, 4, 4a and the arms 22, 23 of the inner housing 21 with one another. Moreover, a web-like connecting rib 39 connects the arms 22 and 23 with one another and imparts high shape stability and strength to the arms.

Figure 4:
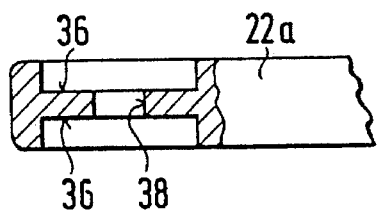
FIG. 4 is a view showing a cross-section of the arm of the inner housing of FIG. 3.

FIG. 4 shows a cross-section of the free ends 22a, 23a of the arms 22, 23 with the ear 35 (36) and the throughgoing opening 37 (38).

Figure 5:
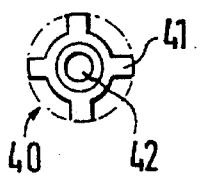
FIG. 5 is a view on a screw head of a synthetic plastic shell of the inventive sword saw.

FIG. 5 shows a cylindrical projection 40 which is arranged many times of the synthetic plastic shells 3, 4, 4a of FIG. 2 and serves as a spacer member and a centering member relative to the inner housing 21. The projection 40 has four crossing radial ribs 41 and a throughgoing opening 42. The ribs 41 form an outer diameter which is only insignificantly smaller than the inner diameter of the ear 35, 36 on the arms 22, 23. Thereby a special fit is produced between the projection and the ears 35, 36 so that the throughgoing opening 37, 38, 42 are in alignment with one another.

Figure 6:
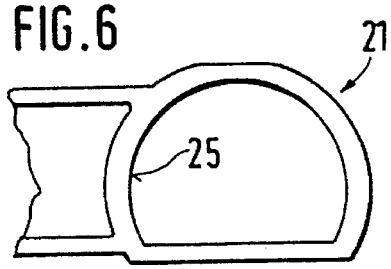
FIG. 6 is a side view of a guiding cylinder of the inner housing of the inventive sword saw.

FIG. 6 shows a section of the guiding cylinder 25 of the inner housing 21. The guiding cylinder is formed for receiving the spacer pipe 24 of the auxiliary handle 7.

Figure 7:
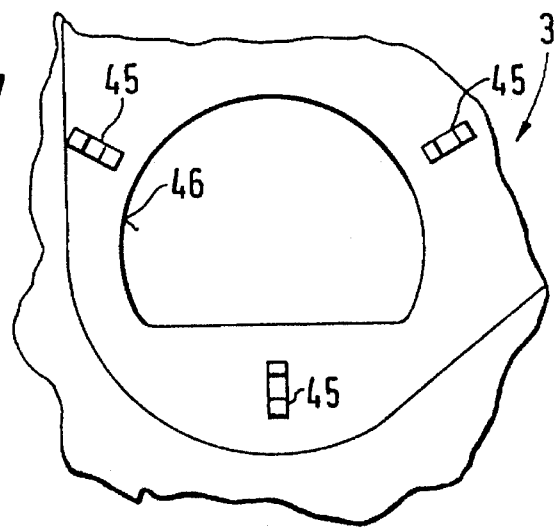
FIG. 7 is a view showing a region of a synthetic plastic shell which is adjacent to the guiding cylinder.

FIG. 7 shows a portion of the synthetic shell 3 which is adjacent to the guiding cylinder 25 and is provided with three centering ribs 45. The centering ribs conically engage the guiding cylinder 25 from outside and center the recess 46 for passage of the spacer pipe 24 relative to the inner housing 21.

Figure 8:
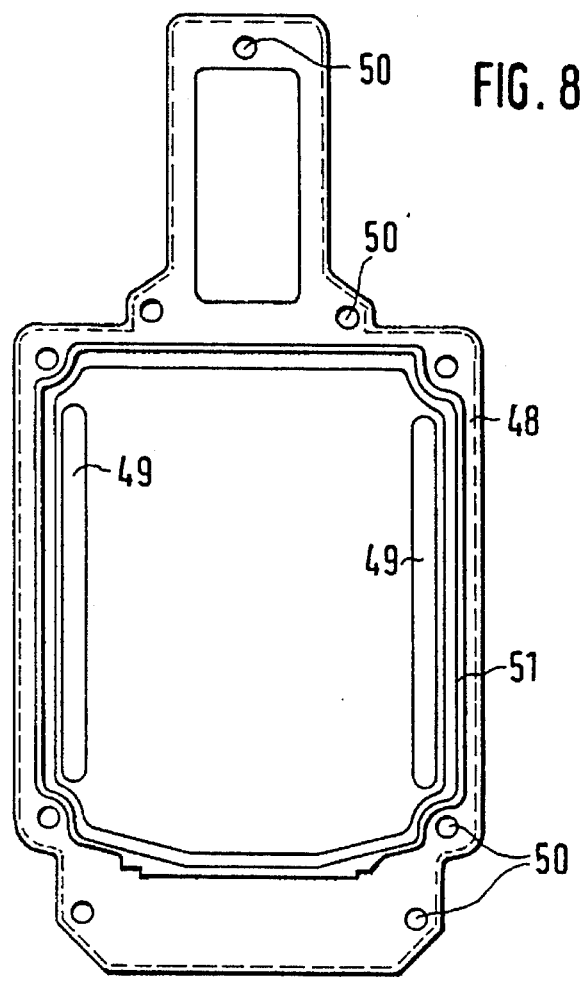
FIG. 8 is a view showing one embodiment of a lower sealing cover of the inner housing of the inventive sword saw.

FIG. 8 shows a further embodiment of a lower sealing cover 47 of the inner housing 21. It is provided with circumferential sealing strips 48 which are cast on it at both sides, with serration 49 for increasing the shape stability of the sealing cover 47, and with openings 50 for mounting the sealing cover 47 of the inner housing 21. Moreover, the sealing strip 48 has a circumferential sealing lip 51 which projects perpendicularly from the plane of the sealing cover 47.

Figure 9:
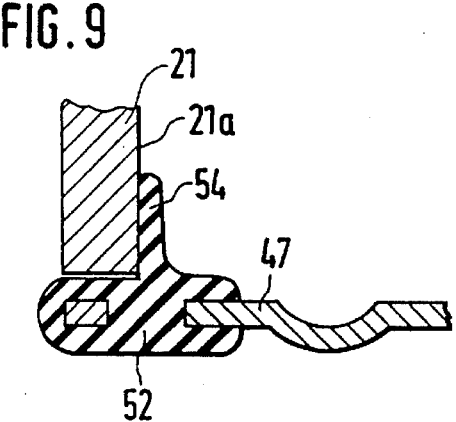
FIGS. 9, 10, 11 are views showing several embodiments of the sealing strips which are formed on the sealing cover at its both sides.
Figure 10:
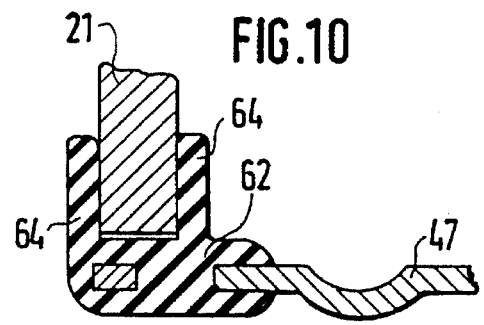
Figure 11:
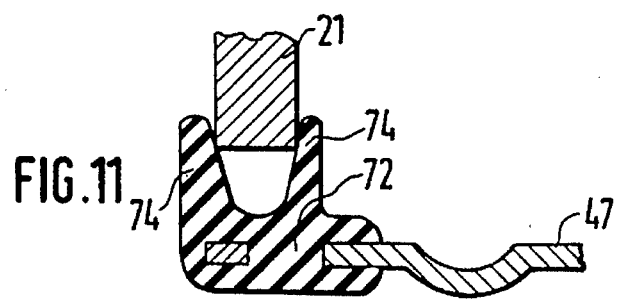

FIGS. 9, 10 and 11 show further embodiments of the sealing strips 52, 62, 72 and the sealing lips 54, 64, 74. It can be seen that the sealing cover 47 in the region of the sealing strip 52, 62, 72 is at least partially provided with recesses, so as to provide a mutual penetration between the metal plate material and the sealing mass.

FIG. 9 shows the sealing strip 52 with a sealing lip 54 which extends only perpendicularly upwardly and abuts against the inner wall of the inner housing 21. FIG. 10 shows the sealing strip 52 with a double sealing lip 64 which sealingly engages the wall of the inner housing 21 from outside and inside. A U-shaped groove is formed between the sealing lips 34, so that the inner housing wall engages in the groove. In FIG. 11a groove formed between the inner and the outer sealing lips 74 has a V-shape. Thereby, the sealing cover 47 is especially efficiently sealed relative to the inner housing 21 in form of a press fit.

The sealing cover 47 seals the inner housing 21 so as to prevent grease and oil discharge from inside and to prevent penetration of dust from outside. The sealing strip equalizes unevenness between the inner housing and the sealing cover and permits coarse tolerances of the sides of the inner housing 21 and the sealing cover 47.

In accordance with a not shown embodiment the sealing cover is composed of a synthetic plastic material. The material for the sealing strip and the sealing lip which follow the circular housing contour can be silicon, NDR, PUR or the like. The inner housing is composed of aluminum, preferably die-cast material.

A durable, exact and cost-favorable adjusting of the inner housing relative to the synthetic plastic shells, or in other words the exact alignment of the bearing seats for the upper and lower bearings of the rotor, is therefore possible by correcting the cast and pressure tool of the synthetic plastic shells.

It will be understood that each of the elements described above, or two or more together, may also find a useful application in other types of constructions differing from the types described above.

While the invention has been illustrated and described as embodied in a hand machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand-held machine tool assembly operated with two hands, comprising a machine housing composed of insulating synthetic plastic shells; a fixed main handle formed as a part of said machine housing; an auxiliary handle; a drive including a motor; at least one inner housing accommodating said motor and surrounded by said synthetic plastic shells; and a tool driven by said drive; said handles being connected with said inner housing and said inner housing being connected with said tool so that forces applied to at least one of said handles are transferred during operation directly to said inner housing without being applied to and thereby deforming said machine housing and then the forces are transferred from the inner housing to said tool, said inner housing having two arms provided with ends which are directly connected with said main handle, said inner housing being provided with a guiding cylinder directly connecting said auxiliary handle to said inner housing, and said tool having a sword which carries saw blade and is connected with said inner housing.

2. A hand-held machine tool assembly as defined in claim 1; and further comprising an upper bearing and a lower bearing for said motor, said synthetic plastic shells being provided with an upper bearing seat and a lower bearing seat for said upper bearing and said lower bearing, respectively, said synthetic plastic shells being centered relative to said inner housing so that said bearing seats are in alignment with one another.

3. A hand-held machine tool assembly as defined in claim 2, wherein said synthetic plastic shells are formed as synthetic plastic halves of said machine housing.

4. A hand-held machine tool assembly as defined in claim 1, wherein said inner housing is composed of metal.

5. A hand-held machine tool assembly as defined in claim 1, wherein said main handle has ends engaging with said arms of said inner housing and connected with said arms in a force-transmitting manner.

6. A hand-held machine tool assembly as defined in claim 5; and further comprising means for connecting said ends of said main handle with said arms of said inner housing, said connecting means including screws.

7. A hand-held machine tool assembly as defined in claim 1; and further comprising means for centering said synthetic plastic shells relative to said inner housing.

8. A hand-held machine tool assembly as defined in claim 1; and further comprising at least one sealing cover which covers said inner housing and is sealed to prevent lubricant leaks.

9. A hand-held machine tool assembly hand machine tool as defined in claim 8; and further comprising sealing means for sealing said cover, said sealing means including a sealing strip and a sealing lip.

10. A hand-held machine tool as defined in claim 9, wherein said sealing means is formed as a component of said sealing cover which is not releasable from said sealing cover without being destroyed.

11. A hand-held machine tool assembly as defined in claim 1, wherein said saw blade is and a reciprocable saw blade which is guided in said sword, so as to form a sword saw.

* * * * *